United States Patent
Tzukerman et al.

(10) Patent No.: US 6,724,829 B1
(45) Date of Patent: Apr. 20, 2004

(54) AUTOMATIC POWER CONTROL IN A DATA TRANSMISSION SYSTEM

(75) Inventors: Shimon Tzukerman, Kibbutz Lohamey Hagetaot (IL); Gadi Kalit, Acco (IL); Ladd S. El Wardani, La Jolla, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/272,632

(22) Filed: Mar. 18, 1999

(51) Int. Cl.⁷ .................. H04L 27/20; H04L 27/36
(52) U.S. Cl. .................. 375/295; 375/298; 375/308
(58) Field of Search .................. 375/219, 222, 375/257, 295, 298, 308, 345, 279, 261; 485/23.1, 234.1; 330/51, 129, 254; 704/258; 102/512

(56) References Cited

U.S. PATENT DOCUMENTS

| | | | | |
|---|---|---|---|---|
| 5,155,590 A | * | 10/1992 | Beyers, II et al. | 725/107 |
| 5,202,553 A | * | 4/1993 | Geller | 250/214 A |
| 5,678,198 A | * | 10/1997 | Lemson | 455/67.1 |
| 5,873,063 A | * | 2/1999 | Wu et al. | 704/258 |
| 5,982,813 A | * | 11/1999 | Dutta et al. | 375/219 |
| 6,075,812 A | * | 6/2000 | Cafarella et al. | 375/141 |
| 6,084,919 A | * | 7/2000 | Kleider et al. | 375/285 |
| 6,111,459 A | * | 8/2000 | Nishijima et al. | 330/51 |
| 6,452,964 B1 | * | 9/2002 | Yoshida | 375/222 |

* cited by examiner

*Primary Examiner*—Chieh M. Fan
(74) *Attorney, Agent, or Firm*—Christopher J. Rourk; Akin Gump Strauss Hauer & Feld, LLP

(57) ABSTRACT

A system for use in transmitting digital data includes a modulation element that receives block of digital data and modulates each block using one of at least two modulation types, such as QPSK and k-QAM, where k is a power of 2. The system also includes an automatic power control element that applies a selected gain value to each of the blocks of data before transmission. The automatic power control element selects each of the gain values from a group of at least two predetermined gain values, each of which corresponds to one of the modulation types. In general, the modulation types have different associated average power levels, and the power control element selects the gain values to maintain substantially constant average transmission power level among all of the blocks of data.

27 Claims, 4 Drawing Sheets

AUTOMATIC POWER CONTROL IN A DATA TRANSMISSION SYSTEM

TECHNICAL FIELD

The invention relates to automatic power control in a data transmission system.

BACKGROUND

Cable modems allow computer systems to transmit and receive data over an ordinary cable television (TV) network. The cable modem receives a TV signal and downconverts this signal to obtain a digital signal suitable for computer operation. Because existing cable infrastructure does not provide a dedicated communication line for each subscriber, subscribers in an area must share a cable that leads to a server located at a head-end unit, known as a Cable Modem Termination System (CMTS). The CMTS serves all of the cable modems in a particular subscription area.

FIG. 1 shows the transmission path over a cable TV network that includes a head-end unit, or Cable Modem Termination System (CMTS) 102, and a cable modem 104 at a subscriber site. The head-end includes an interface 108 to a data-over-cable wide-area network (WAN) 100. Each subscriber site includes an interface 112 between the cable modem 104 and the subscriber computer 106. This interface 112, known as the cable-modem-to-customer-premises-equipment interface, usually includes a Peripheral Component Interface (PCI) bus, a Universal Serial Bus (USB), or an Ethernet type connection.

Signals transmitted from the cable modem 104 to the CMTS 102, i.e., in the "up-stream" direction, are sent in bursts so that many cable modems can transmit on the same frequency. This frequency sharing technique is commonly known as time-division multiple access (TDMA). In general, digital data from the subscriber computer 106 is encoded by the cable modem 104 on a burst-by-burst basis. A burst modulator in the cable modem 104 modulates the encoded signal using a common modulation technique. The modem 104 then transmits the signal to the CMTS 102 at an assigned carrier frequency, typically between 5 MHz and 42 MHz. Because this band is particularly susceptible to noise, including interference from Citizen Band (CB) radios and impulse noise from home appliances, most cable modems use a low order modulation scheme, such as QPSK (Quadrature Phase Shift Keying) or 16 QAM (Quadrature Amplitude Modulation), that is robust in noisy environments. In general, cable modems use more than one modulation technique, such as QPSK and 16 QAM, often switching among techniques from burst to burst.

Because the CMTS 102 must manage a variety of signals intended for multiple subscribers, the CMTS 102 sends control packets that provide the cable modem 104 at the subscriber site with instructions for sending and receiving data packets. A control packet usually indicates the frequency and the power level at which the cable modem 104 should transmit data packets, as well as the type of modulation to use for each data burst. The control packet also tells the cable modem 104 how many packets to transmit upstream and which downstream data packets are intended for the cable modem 104. From this information, the cable modem 104 determines FEC coding gains, signal-to-noise-ratio (SNR) requirements, packet lengths, and modulation types.

The RF communication path 110 and the structure for data and control packets sent over this communication path 110 are defined in the Data-Over-Cable Service Interface Specifications, Radio Frequency (RF) Interface Specification, SP-RFIv1.1-D01-98214, published by Cable Television Laboratories, Inc. This specification requires the expected average power level for upstream signals to remain constant. However, the average power level in a cable modem that uses multiple modulation techniques varies as the modulation technique changes from burst to burst. Therefore, cable modems that use multiple modulation techniques for upstream communication inherently violate the RF Interface Specification.

SUMMARY

One aspect of the invention involves the transmission of digital data over a transmission channel, such as a cable TV network, by receiving blocks of data and modulating each block using one of at least two modulation types. A selected gain value is applied to each block of data before transmission. This gain value is selected from a group of at least two predetermined gain values, each of which corresponds to one of the modulation types.

In some embodiments, the gain values are selected and applied to the blocks of data by an automatic power control element that includes a gain element and a control element. The gain element applies the selected gain values to the blocks of data, and the control element selects the gain values from the group of predetermined values. In some cases, the control element includes a switch that selectively provides the gain values to the gain element in response to a signal indicating the modulation type to be used in transmitting each of the blocks of data.

In other embodiments, the modulation types have different associated average power levels. Suitable modulation types include QPSK and k-QAM, where k is a power of 2. In many of these embodiments, the gain values are selected to maintain substantially constant average transmission power level among all of the blocks of data. A digital storage device often is used to store the predetermined gain values.

In another aspect, the invention features an automatic power control system for use in transmitting digital data over a transmission channel, such as a cable TV network. The power control system includes a gain element that receives blocks of digital data, each of which is to be transmitted using one of at least two different modulation types. The gain element applies a selected gain value to each of the blocks of data before transmission. The power control system also includes a control element that selects the gain value to be applied to each of the blocks of data from a group of at least two predetermined gain values, each corresponding to one of the modulation types.

Among the advantages of the invention is the ability to maintain a substantially constant average power level from data burst to data burst, even when different modulation types are used. As a result, a data transmission system, such as a cable modem, can share a transmission channel and a power amplification circuit with other systems without cutting into the power allocated to the other systems.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
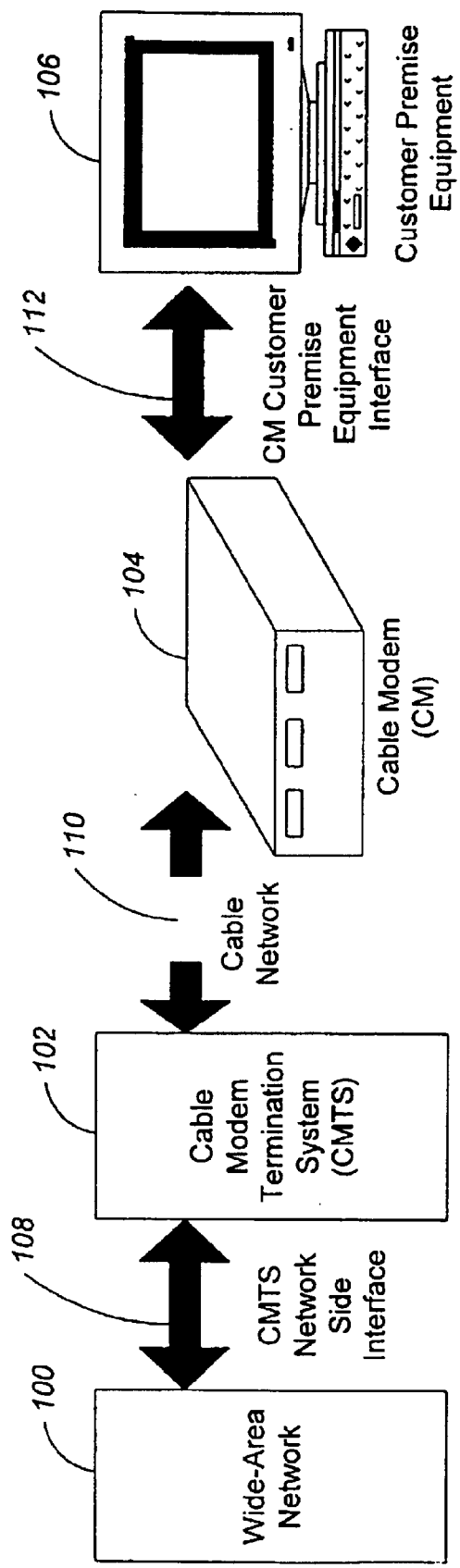
FIG. 1 is a functional block diagram of a transmission path over a cable system.
Figure 2C:
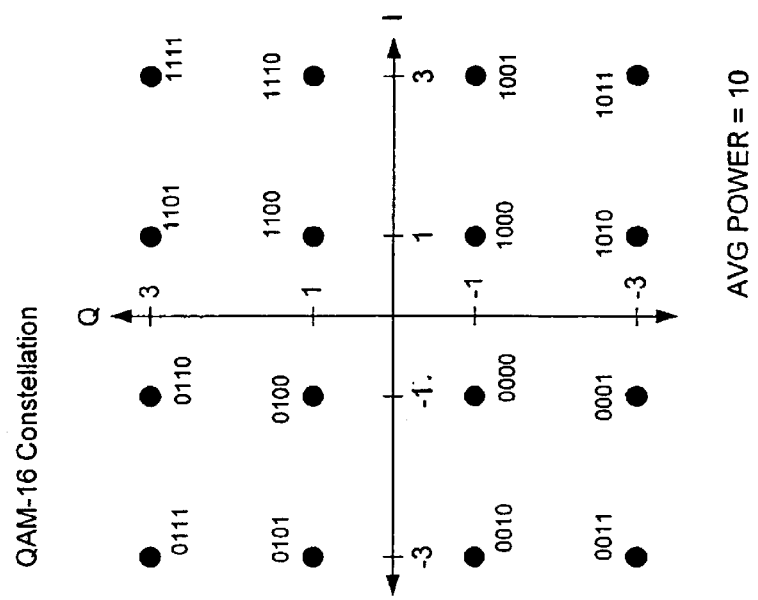
FIG. 2C is a plot of a 16 QAM symbol constellation in which the I and Q components of the symbols have amplitudes of ±1 and ±3.
Figure 2A:
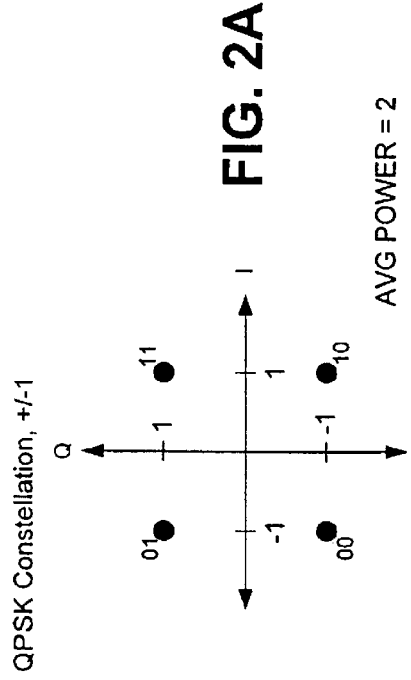
FIG. 2A is a plot of a QPSK symbol constellation in which the I and Q components of the symbols have amplitudes of ±1.
Figure 2B:
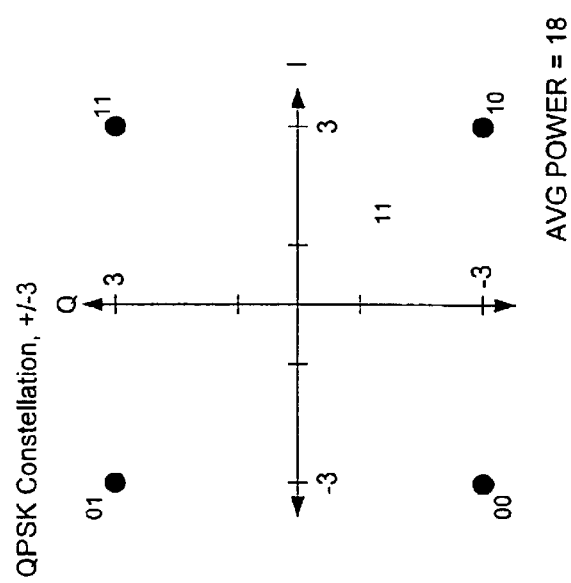
FIG. 2B is a plot of a QPSK symbol constellation in which the I and Q components of the symbols have amplitudes of ±3.

FIGS. 2A, 2B, and 2C illustrate three modulation techniques used in cable modems. The average signal power associated with each of these techniques differs from the average signal power associated with the other techniques. FIG. 2A is a plot of a QPSK modulation technique in which two bits of digital data are mapped to one of four symbols. Each symbol has in-phase (I) and quadrature (Q) components with amplitudes of ±1. The power level associated with each symbol equals the sum of the squares of the I and Q components. The average power level associated with the modulation technique equals the sum of the power levels of all symbols divided by the number of symbols. For a modulation scheme that is symmetric about both the I and Q axes, the average power is equal in all four quadrants. Therefore, the average power for the 4-ary QPSK scheme of FIG. 2A is two power units $[(1^2+1^2) \div 1=2]$, where each symbol has an associated power of two power units.

FIG. 2B shows a 4-ary QPSK symbol mapping technique for which the I and Q components have amplitudes of ±3. The total power associated with each symbol, and therefore the average power for this modulation scheme, is 18 power units $[(3^2+3^2) \div 1=18]$.

FIG. 2C shows a 16 QAM symbol mapping technique having four symbols in each quadrant. Four of these symbols have I and Q components with amplitudes of ±1; four have I and Q components with amplitudes of ±1 and ±3, respectively; four have I and Q components with amplitudes of ±3 and ±1, respectively; and four have I and Q components with amplitudes of ±3. The average power level for the symbols in each quadrant, and therefore the average power level for the modulation scheme, is ten power units $[((1^2+1^2)+(1^2+3^2)+(3^2+1^2)+(3^2+3^2)) \div 4=10]$.

Figure 3:
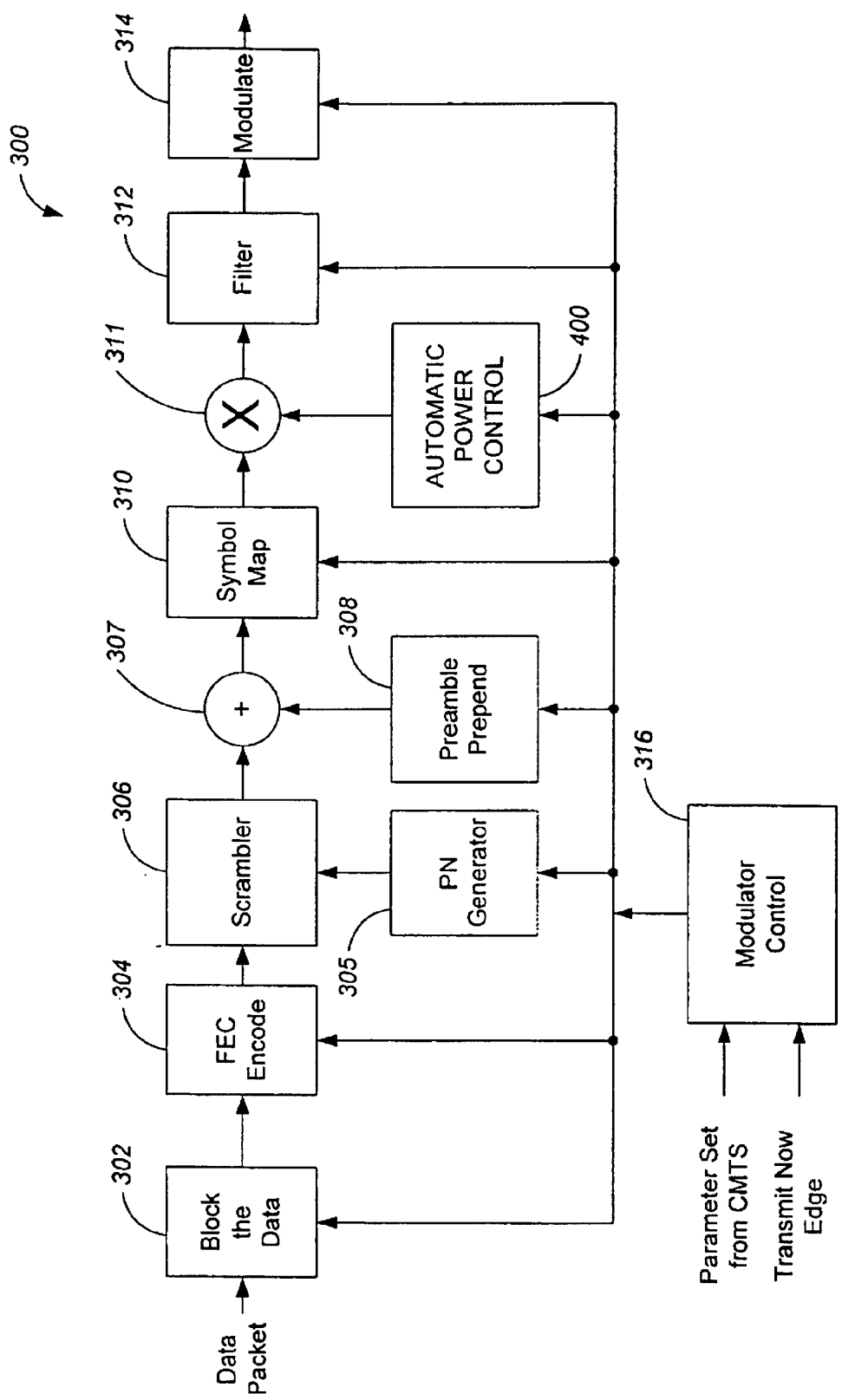
FIG. 3 is a functional block diagram of cable modem transmission path with automatic power control.

FIG. 3 shows a cable modem 300 with automatic power control in its upstream transmission path. The cable modem 300 typically uses a TDMA burst modulation format, which provides multiple symbol rates and multiple modulation formats, such as QPSK and 16 QAM. Some embodiments of the modem 300 use variable-length modulated bursts with precise timing beginning at burst boundaries separated by integer multiples of 6.25 μsec. In these embodiments, the modem supports both QPSK and 16 QAM modulation schemes at symbol rates of 160, 320, 640, 1,280, and 2,560 ksym/sec. The modem changes its power settings from data burst to data burst by selecting an appropriate gain from a group of predetermined gain values based upon the type of modulation that is used to encode each data burst.

The first element in the modem's upstream transmission path is a data blocking circuit 302 that receives incoming data packets from a subscriber computer and separates the packets into discrete information blocks. The data blocking circuit provides these information blocks to an FEC encoder 304 in the form of a serial bit stream. The FEC encoder 304 encodes these information blocks using a conventional encoding technique, such as a Reed-Solomon error correction algorithm. For example, some embodiments of the FEC encoder 304 map the first bit of the incoming data stream to the most significant bit (MSB) of the first Reed-Solomon symbol entering the encoder 304. The encoder 304 then maps the MSB of its first output symbol into the first bit of an output serial bit stream. The code words generated by the FEC encoder 304 typically vary in length from 18 bytes (16 bytes of information plus two parity bytes) to 255 bytes. Uncoded words are usually no shorter than one byte in length. The FEC encoder 304 is selectively enabled/disabled by a control signal produced by a modulator controller 316, which is described below.

A data scrambler 306 receives the coded data stream from the FEC encoder 304 and scrambles the coded data using a bit sequence provided by a pseudorandom number (PN) generator 305. The PN generator 305 usually is implemented as a feedback shift register (e.g., a 16-bit register) with a characteristic polynomial (e.g., $x^{15}+x^{14}+1$) which produces a pseudorandom bit sequence that repeats periodically. The shift register is cleared and then loaded with a selected seed value at the beginning of each data burst period.

A prepending circuit 307 receives the scrambled code word from the data scrambler 306 and prepends a variable length preamble provided by a preamble circuit 308. In general, the length of the preamble does not exceed 512 QPSK symbols or 256 QAM symbols. The length and content of the preamble are determined by a command message received from the head-end unit.

A symbol mapper 310 receives the scrambled data word from the prepending circuit 307 and maps the bit patterns into the I and Q constellation of a selected modulation type, as shown in FIGS. 2A, 2B, and 2C. The selected I and Q constellation determines the phase and the amplitude of the signal transmitted upstream by the cable modem 300. A control signal from the modulation controller 316 indicates which modulation type, and thus which I and Q constellation, are to be used for each data burst.

The symbol mapper 310 delivers its output signal to a gain element 311. The gain element 311 boosts the power of the output signal by a selected amount, as determined by an automatic power control circuit 400. The automatic power control circuit 400 selects the power gain for each data burst from a group of predetermined values that correspond to the different modulation techniques used by the modem 300. The automatic power control circuit 400 is described in more detail below.

The amplified signal is provided to a spectral shaping filter 312 and to an RF modulator 314 for transmission over the cable network. One principal advantage of the QAM and QPSK modulation techniques is high spectral efficiency and low bit error rate (BER). When these modulation techniques are used, the RF modulator 314 combines two independent, orthogonal, bi-phase (I and Q) signals on one RF carrier signal.

The modulator controller 316 controls the flow and the sequence of the upstream data transmission process. The controller 316 sends a control signal to the data blocking circuit 302 to begin separating the incoming data packet into discrete data blocks. The controller 316 also sends commands to the FEC encoder 304, including a command that enables or disables the FEC encoder 304 in response to commands received from the CMTS. The controller 316 also provides control signals to the PN generator 305 and the preamble prepend circuit 308, including signals that load the seed vector in the PN generator 305 and that determine the preamble length and the preamble value.

The modulator controller 316 receives a signal from the CMTS indicating which type of modulation to use for each data burst and delivers a corresponding control signal to the symbol mapper 310 and the power control circuit 400. The modulator controller 316 also provides the spectral filter 312 with a maximum allowable channel width for a particular symbol rate, and commands the RF modulator 314 to transmit an upstream burst data in response to a "Transmit Now" signal from the CMTS.

Figure 4:
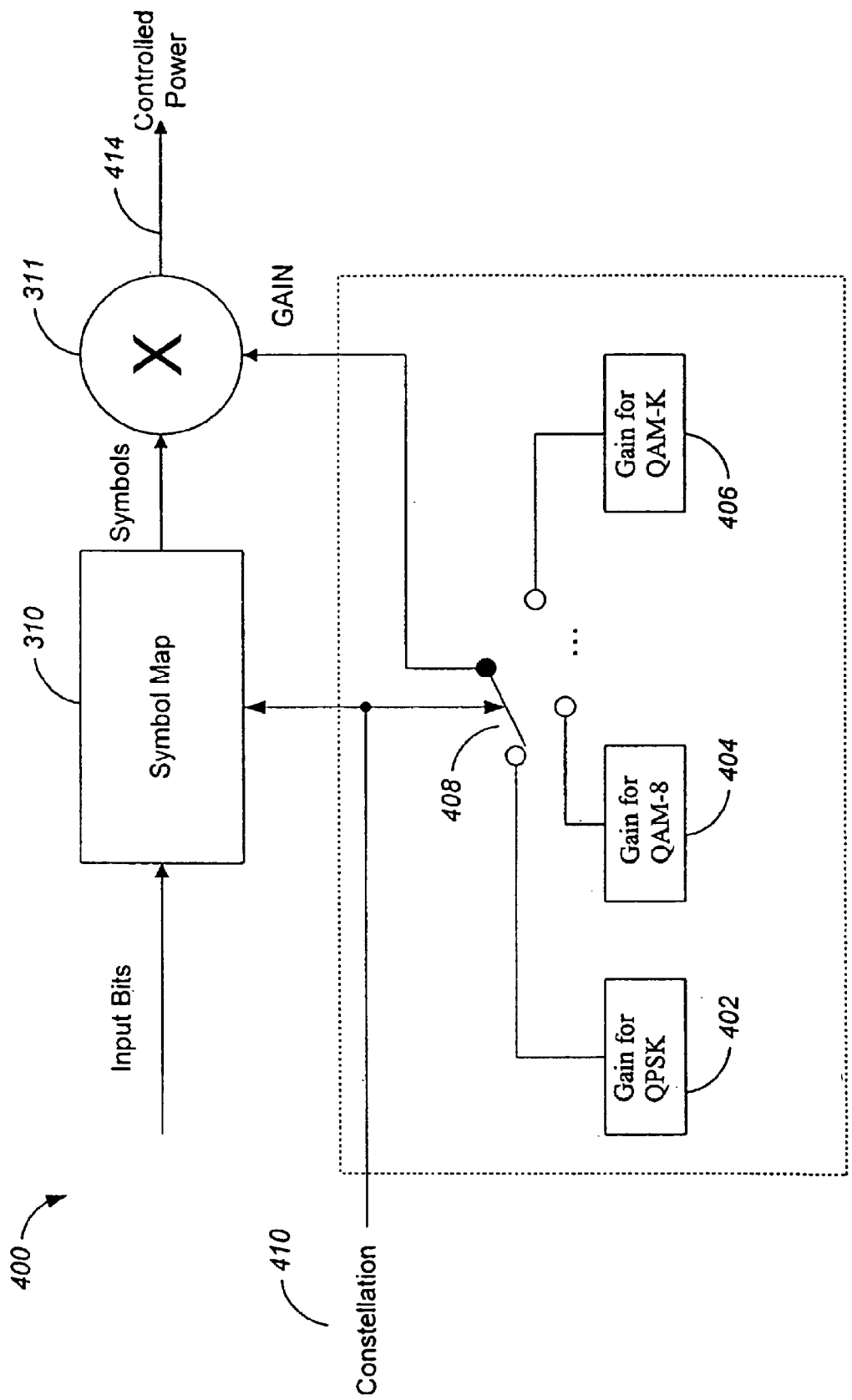
FIG. 4 is a functional block diagram of an automatic power control system for a cable modem.

FIG. 4 shows one implementation of the automatic power control circuit 400. The circuit 400 includes multiple storage areas 402, 404, 406, such as data registers or cells in a read-only or random access memory device, that store a set of predetermined gain values. Each of the gain values corresponds to one of the modulation techniques used by the cable modem. A switch 408 selectively applies one of the gain values stored in the registers 402, 404, 406 to the gain element 312 during each data burst. The position of the switch 408 during each data burst is controlled by a constellation signal 410 that indicates the modulation type for each data burst. The power control circuit 400 receives the constellation signal from the modulation controller 316, as discussed above.

In the example of FIG. 4, the power control circuit 400 includes one register 402 to store a predetermined gain value for QPSK modulated signals and several registers 402, 404 to store predetermined gain values for several k-QAM modulated signals, where k is a power of two. The gain values are selected so that the amplified signal, when transmitted upstream, has a substantially constant average power level during all data bursts, regardless of the modulation types used during the data bursts.

A number of embodiments of the present invention have been described. Nevertheless, it will be understood that various modifications may be made without departing from the spirit and scope of the invention. For example, the gain element and the automatic power control circuit are not always located immediately after the symbol mapper. Alternative embodiments place these elements behind the FEC encoder, the scrambler, the spectral shaping filter, or the RF modulator. Likewise, alternative embodiments of the power control circuit implement the switch in various ways, such as with one or more transistors, a digital logic array, or a programmed microprocessor. In some embodiments, the gain values are stored in programmable media and are adjusted occasionally to maximize the performance of the cable modem. Accordingly, other embodiments are within the scope of the following claims.

What is claimed is:

1. A system for use in transmitting digital data, the system comprising:
   (a) a modulation element configured to receive blocks of digital data and to modulate each block using one of at least two digital modulation types, each having different associated power levels;
   (b) an automatic power control element configured to:
      (1) apply a selected gain value to each of the blocks of modulated data before transmission;
      (2) select the gain value to be applied to each of the blocks of modulated data from a group of at least two predetermined gain values, each corresponding to one of the modulation types, where the selected gain values maintain substantially constant average transmission power level among all of the blocks of modulated data; and
   (c) a register in which the predetermined gain values are stored.

2. The system of claim 1, wherein the automatic power control element includes a gain element that applies the selected gain values to the blocks of modulated data and a control element that selects the gain values from the group of predetermined gain values.

3. The system of claim 2, wherein the control element includes a switch that selectively applies the gain to the gain element in response to a signal indicating the modulation type to be used in transmitting each of the blocks of modulated data.

4. The system of claim 1, further comprising a transmission element configured to transmit each block of modulated data over a transmission channel during a predetermined time slot assigned to the block of modulated data.

5. The system of claim 4, wherein the transmission channel comprises a cable TV network.

6. The system of claim 1, further comprising a data blocking element configured to receive a stream of digital data and to divide the stream into the blocks of digital data.

7. The system of claim 1 wherein the digital modulation types have different associated average power levels.

8. The system of claim 1, wherein the digital modulation types include QPSK and k-QAM, where k is a power of two.

9. A system for use in transmitting digital data, the system comprising:
   (a) a modulation element configured to receive blocks of digital data and to modulate each block using one of at least two digital modulation types, each having different associated power levels;
   (b) an automatic power control element configured to:
      (1) apply a selected gain value to each of the blocks of modulated data before transmission;
      (2) select the gain value to be applied to each of the blocks of modulated data from a group of at least two predetermined gain values, each corresponding to one of the digital modulation types, where the selected gain values maintain substantially constant average transmission power level among all of the blocks of modulated data; and
   a modulation controller configured to provide a signal to the modulation element and to the automatic power control element indicating which of the digital modulation types is to be used in transmitting each block of modulated data.

10. A system for use in transmitting digital data, the system comprising:
   (a) a modulation element configured to receive blocks of digital data and to modulate each block using one of at least two digital modulation types;
   (b) an automatic power control element configured to:
      (1) apply a selected gain value to each of the modulated blocks of data before transmission;
      (2) select the gain value to be applied to each of the blocks of modulated data from a group of at least two predetermined gain values, each corresponding to one of the digital modulation types; and
   wherein the digital modulation types have different associated average power levels, and the automatic power control element is configured to select the gain values to maintain substantially constant average transmission power level among all of the blocks of modulated data.

11. An automatic power control system for use in transmitting digital data, the system comprising:
   (a) a gain element configured to:
      (1) receive blocks of digital data, each of which is to be transmitted using one of at least two different digital modulation types, each having different associated power levels; and
      (2) apply a selected gain value to each of the blocks of modulated data before transmission; and
   (b) a control element configured to select the gain value to be applied to each of the blocks of modulated data from a group of at least two predetermined gain values, each corresponding to one of the digital modulation types, where the selected gain values maintain substantially constant average transmission power level among all of the blocks of modulated data; and
   (c) at least one data storage device that stores each of the predetermined gain values in a dedicated storage location.

12. The system of claim 11, wherein the digital modulation types have different associated average power levels.

13. The system of claim 11, wherein the data storage device comprises a computer memory and each of the dedicated storage locations begins at an individually addressable location in the memory device.

14. The system of claim 11, wherein the data storage device includes multiple registers, each dedicated to storing one of the predetermined gain values.

15. The system of claim 11, wherein the control element includes a switch configured to selectively deliver the gain values from the dedicated storage locations to the gain element.

16. The system of claim 15, wherein the switch is configured to select the gain values in response to a signal indicating, for each of the blocks of modulated data, which of the digital modulation types is to be used in transmitting the block of modulated data.

17. The system of claim 11, wherein the digital modulation types include QPSK and k-QAM, where k is a power of two.

18. An automatic power control system for use in transmitting digital data, the system comprising:
   (a) a gain element configured to:
      (1) receive blocks of digital data, each of which is to be transmitted using one of at least two different digital modulation types; and
      (2) apply a selected gain value to each of the blocks of modulated data before transmission; and
   (b) a control element configured to select the gain value to be applied to each of the blocks of modulated data from a group of at least two predetermined gain values, each corresponding to one of the digital modulation types; and
   wherein the digital modulation types have different associated average power levels, and the control element is configured to select the gain values to maintain substantially constant average transmission power level among all of the blocks of modulated data.

19. A method for use in transmitting digital data comprising:
   storing a group of at least two predetermined gain values;
   receiving blocks of digital data;
   modulating each block using one of at least two digital modulation types;
   selecting a gain value to be applied to each of the blocks of modulated data from the group of at least two predetermined gain values, each corresponding to one of the digital modulation types, each digital modulation type having a different associated power level; and
   applying the selected gain value to each of the blocks of modulated data before transmission, where the selected gain values maintain substantially constant average transmission power level among all of the blocks of modulated data.

20. The method of claim 19, further comprising transmitting each block of modulated data over a transmission channel during a predetermined time slot assigned to the block of modulated data.

21. The method of claim 20, wherein the transmission channel comprises a cable TV network.

22. The method of claim 19, further comprising receiving a stream of digital data and deriving the blocks of digital data from the stream.

23. The method of claim 19, further comprising receiving a signal indicating which of the digital modulation types is to be used in transmitting each block of modulated data.

24. The method of claim 19, wherein the digital modulation types have different associated average power levels.

25. The method of claim 19, wherein the digital modulation types include QPSK and k-QAM, where k is a power of two.

26. A method for use in transmitting digital data comprising:
   receiving blocks of digital data;
   modulating each block using one of at least two digital modulation types;
   selecting a gain value to be applied to each of the blocks of modulated data from a group of at least two predetermined gain values, each corresponding to one of the digital modulation types;
   applying the selected gain value to each of the blocks of modulated data before transmission; and
   wherein the digital modulation types have different associated average power levels and selecting a gain value includes selecting the values to maintain substantially constant average transmission power level among all of the blocks of modulated data.

27. A system for use in transmitting digital data, the system comprising:
   a data blocking element configured to receive a stream of digital data and to divide the stream into blocks of digital data;
   a modulation element configured to receive the blocks of digital data and to modulate each block using one of at least two digital modulation types, including QPSK and k-QAM, where k is a power of two, where the digital modulation types have different associated average power levels;
   an automatic power control element including:
   a gain element that applies a selected gain value to each of the blocks of modulated data before transmission; and
   a control element that selects the gain value to be applied to each of the blocks of modulated data from a group of at least two predetermined gain values, each corresponding to one of the digital modulation types, the control element including a switch that selectively provides the gain values to the gain element in response to a signal indicating the digital modulation type to be used in transmitting each of the blocks of data, such that the selected gain values maintain substantially constant average transmission power level among all of the blocks of modulated data; and a transmission element configured to transmit each block of modulated data over a cable TV network during a predetermined time slot assigned to the block of modulated data.

* * * * *